US012752787B2

(12) United States Patent
Lee et al.

(10) Patent No.: US 12,752,787 B2
(45) Date of Patent: Oct. 6, 2026

(54) APPARATUS AND METHOD FOR CONTROLLING REGENERATIVE BRAKING OF VEHICLE, AND SYSTEM AND METHOD FOR CONTROLLING REGENERATIVE BRAKING BETWEEN VEHICLES

(71) Applicants: Hyundai Motor Company, Seoul (KR); Kia Corporation, Seoul (KR)

(72) Inventors: Dong Hoon Lee, Suwon-si (KR); Han Seung Myoung, Taean-gun (KR); Jin Kyeom Cho, Suwon-si (KR); Joon Shik Park, Seoul (KR); Jeong Yeop Woo, Incheon (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 94 days.

(21) Appl. No.: 18/885,930

(22) Filed: Sep. 16, 2024

(65) Prior Publication Data

US 2025/0162587 A1 May 22, 2025

(30) Foreign Application Priority Data

Nov. 21, 2023 (KR) ........................ 10-2023-0162480

(51) Int. Cl.
*B60W 30/00* (2006.01)
*B60W 30/18* (2012.01)

(52) U.S. Cl.
CPC ... *B60W 30/18127* (2013.01); *B60W 2540/12* (2013.01); *B60W 2554/404* (2020.02)

(58) Field of Classification Search
CPC ....... B60W 30/18127; B60W 2540/12; B60W 2554/404; B60W 30/09; B60W 40/02; B60W 2556/65; B60W 2756/10; B60L 7/18
See application file for complete search history.

(56) References Cited

U.S. PATENT DOCUMENTS

| | | | | |
|---|---|---|---|---|
| 8,016,367 | B2 * | 9/2011 | Hirata | B60W 10/08 303/151 |
| 9,849,911 | B2 * | 12/2017 | Lee | B62D 13/00 |
| 9,956,965 | B1 * | 5/2018 | Hall | B60W 10/22 |
| 10,549,732 | B2 * | 2/2020 | Kasper | B60T 8/17616 |
| 10,618,412 | B2 * | 4/2020 | Han | B60L 7/18 |
| 11,623,637 | B2 * | 4/2023 | Salter | B60L 3/0015 340/932.2 |

(Continued)

*Primary Examiner* — Logan M Kraft
*Assistant Examiner* — Sherman D Manley
(74) *Attorney, Agent, or Firm* — Morgan, Lewis & Bockius LLP

(57) ABSTRACT

A system for controlling regenerative braking between vehicles includes a first regenerative braking control apparatus configured to determine a possibility of collision with an object based on detection information related to the surrounding of a towing vehicle or determine a required braking amount based on vehicle state information of the towing vehicle and output a regenerative braking request to the towed vehicle based on the possibility of collision or the required braking amount, and a second regenerative braking control apparatus configured to perform regenerative braking of the towing vehicle according to the regenerative braking request output from the first regenerative braking control apparatus.

16 Claims, 8 Drawing Sheets

(56) References Cited

U.S. PATENT DOCUMENTS

| | | | | |
|---|---|---|---|---|
| 11,760,355 | B2 * | 9/2023 | Lewandowski | B60W 10/04 701/26 |
| 11,867,520 | B2 * | 1/2024 | Madineni | B60L 58/12 |
| 11,904,702 | B2 * | 2/2024 | Flaum | B60L 15/38 |
| 12,049,210 | B2 * | 7/2024 | Salter | B60L 15/2009 |
| 12,103,433 | B2 * | 10/2024 | Madineni | B60L 1/00 |
| 12,330,636 | B2 * | 6/2025 | Fukui | B60W 30/09 |
| 12,358,377 | B2 * | 7/2025 | Yhr | B60L 7/10 |
| 2002/0095251 | A1 * | 7/2002 | Oh | B60T 8/246 701/41 |
| 2007/0198136 | A1 * | 8/2007 | Kobayashi | B60K 26/021 701/1 |
| 2009/0306861 | A1 * | 12/2009 | Schumann | B60T 8/17552 303/123 |
| 2011/0015818 | A1 * | 1/2011 | Breuer | B60W 30/085 701/31.4 |
| 2012/0101713 | A1 * | 4/2012 | Moshchuk | B60W 40/064 701/301 |
| 2013/0311058 | A1 * | 11/2013 | Wojtkowicz | B60L 15/2009 701/70 |
| 2015/0120138 | A1 * | 4/2015 | Zeng | G01S 13/931 701/41 |
| 2017/0015203 | A1 * | 1/2017 | Oguri | B60L 50/62 |
| 2017/0235307 | A1 * | 8/2017 | Asakura | B60W 30/18163 701/23 |
| 2019/0009760 | A1 * | 1/2019 | Zenner | B60T 8/323 |
| 2019/0084533 | A1 * | 3/2019 | Kasper | B60T 13/683 |
| 2019/0084540 | A1 * | 3/2019 | Kasper | B60T 8/176 |
| 2019/0202296 | A1 * | 7/2019 | Han | B60L 7/18 |
| 2019/0322273 | A1 * | 10/2019 | Wu | B60W 30/09 |
| 2020/0331527 | A1 * | 10/2020 | Kim | B62D 15/021 |
| 2021/0197673 | A1 * | 7/2021 | Espig | B60L 53/53 |
| 2022/0153234 | A1 * | 5/2022 | Shimizu | B60W 30/09 |
| 2022/0388484 | A1 * | 12/2022 | Salter | B60T 17/22 |
| 2022/0396271 | A1 * | 12/2022 | Lewandowski | B60W 10/20 |
| 2023/0061982 | A1 * | 3/2023 | Fukui | B60T 7/20 |
| 2023/0063729 | A1 * | 3/2023 | Fukui | B60W 30/09 |
| 2023/0219566 | A1 * | 7/2023 | Fukui | B60W 10/18 701/301 |
| 2023/0234575 | A1 * | 7/2023 | Iwase | B60W 30/09 |
| 2024/0182035 | A1 * | 6/2024 | Lin | B60W 30/0956 |
| 2024/0300460 | A1 * | 9/2024 | Fan | B60T 8/1708 |

* cited by examiner

APPARATUS AND METHOD FOR CONTROLLING REGENERATIVE BRAKING OF VEHICLE, AND SYSTEM AND METHOD FOR CONTROLLING REGENERATIVE BRAKING BETWEEN VEHICLES

CROSS REFERENCE TO RELATED APPLICATION

The present application claims priority of Korean Patent Application No. 10-2023-0162480 filed on Nov. 21, 2023, the entire contents of which is incorporated herein for all purposes by this reference.

BACKGROUND OF THE PRESENT DISCLOSURE

Field of the Present Disclosure

The present disclosure relates to a technology of controlling regenerative braking of a vehicle, and specifically, to a technology of controlling regenerative braking performed between a plurality of vehicles.

Description of Related Art

Recently, as interest in the environment has increased, the number of eco-friendly vehicles equipped with electric motors as a power source is increasing. Eco-friendly vehicles are also referred to as electrified vehicles, and representative examples of the eco-friendly vehicles may include hybrid electric vehicles (HEV) or electric vehicles (EV).

For example, an eco-friendly vehicle may be braked by converting the kinetic energy of the vehicle into electrical energy by operating a motor as a generator together with a current hydraulic friction brake, and the present type of braking is referred to as regenerative braking.

In general, the eco-friendly vehicle monitors a surrounding environment and generates a braking force by regenerative braking for emergency braking when an unexpected situation such as a collision is predicted.

Meanwhile, when two or more vehicles are operated by being physically connected, a state of one vehicle affects the ability of the other vehicle to perform regenerative braking.

An example in which two or more vehicles are operated by being physically connected includes a case in which a towing vehicle tows a towed vehicle by a flat towing method. The flat towing is a method of towing a towed vehicle in a state in which four wheels of the towed vehicle touch the ground.

A vehicle implemented for towing, that is, a vehicle which may be used as a towing vehicle should be additionally provided with a braking device (e.g., a hydraulic pump) to secure an additional braking force for the towed vehicle.

Conventionally, there is a problem in that since a driver of the towing vehicle directly operates to generate a braking force for the towed vehicle, a braking force for the towed vehicle may be secured at an appropriate time in an unexpected situation such as sudden braking.

When the braking force generated from the towing vehicle is not sufficient to brake the towed vehicle or when the braking force for the towed vehicle may not be secured at the appropriate time, the towing vehicle may collide with an obstacle (e.g., a front vehicle).

Therefore, when the unexpected situation such as a collision occurs, a method capable of effectively securing a braking force for the towed vehicle is required.

Furthermore, the recognition of the unexpected situation is made by the towing vehicle, and it is possible to secure a sufficient braking force only when the braking of the towing vehicle and the braking of the towed vehicle are performed systematically, and thus a method in which the towing vehicle may effectively control the braking of the towed vehicle is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a technology of controlling regenerative braking performed between two different vehicles.

Embodiments of the present disclosure are also directed to providing an apparatus and a method for controlling regenerative braking implemented in a towing vehicle to control regenerative braking of a towed vehicle.

Furthermore, various exemplary embodiments of the present disclosure are also directed to providing an apparatus and a method for controlling regenerative braking implemented in a towed vehicle to control regenerative braking of a host vehicle in response to a request from a towing vehicle.

Furthermore, various exemplary embodiments of the present disclosure are also directed to providing a system and a method for controlling regenerative braking between vehicles including an apparatus for controlling regenerative braking implemented in a towing vehicle and an apparatus for controlling regenerative braking implemented in a towed vehicle.

Objects of the present disclosure are not limited to the above-described objects, and those skilled in the art to which the present disclosure pertains will be able to clearly understand other objects intended by the present disclosure from the following description.

As a technical means for achieving the objects, there may be provided an apparatus and a method for controlling regenerative braking implemented in a towing vehicle to control regenerative braking of a towed vehicle.

Furthermore, there may be provided an apparatus and a method for controlling regenerative braking implemented in a towed vehicle to control regenerative braking of a host vehicle in response to a request from a towing vehicle.

Furthermore, there may be provided a system for controlling regenerative braking between vehicles including a regenerative braking control apparatus implemented in a towing vehicle and a regenerative braking control apparatus implemented in a towed vehicle, and a method of controlling regenerative braking.

An apparatus for controlling regenerative braking of a vehicle according to an exemplary embodiment of the present disclosure, which is mounted in a towing vehicle and configured to control regenerative braking of a towed vehicle, including a receiving unit configured to receive at least one of detection information related to the surrounding of a host vehicle and vehicle state information of the host vehicle, and a control unit configured to determine a possibility of collision with an object based on the detection information or determine a required braking amount based on the vehicle state information and output a request for the regenerative braking for the towed vehicle to the towed vehicle.

According to the exemplary embodiment of the present disclosure, the control unit may output a regenerative braking entry request or an emergency regenerative braking request according to the possibility of collision or the required braking amount.

According to the exemplary embodiment of the present disclosure, the control unit may be configured to determine a time to collision (TTC) between the host vehicle and the object, compare the TTC with preset first and second thresholds, and output the regenerative braking entry request or the emergency regenerative braking request according to a result of the comparison.

According to the exemplary embodiment of the present disclosure, the second threshold may be smaller than the first threshold.

According to the exemplary embodiment of the present disclosure, the control unit may output the regenerative braking entry request when the TTC is smaller than or equal to the first threshold and greater than the second threshold and output the emergency regenerative braking request when the TTC is smaller than or equal to the second threshold.

According to the exemplary embodiment of the present disclosure, the control unit may be configured to determine the required braking amount by integrating a brake pedal displacement amount among the vehicle state information, output the regenerative braking entry request when the required braking amount is greater than or equal to a third threshold and smaller than a fourth threshold, and output the emergency regenerative braking request when the required braking amount is greater than or equal to the fourth threshold.

According to the exemplary embodiment of the present disclosure, the third threshold may be smaller than the fourth threshold.

According to the exemplary embodiment of the present disclosure, the control unit may be configured to determine a regenerative braking level corresponding to the TTC when the TTC is smaller than or equal to the first threshold and greater than the second threshold and provide information related to the regenerative braking level to the towed vehicle.

A method for controlling regenerative braking of a vehicle according to an exemplary embodiment of the present disclosure, which controls regenerative braking of a towed vehicle by a control device mounted in a towing vehicle including determining a possibility of collision with an object based on detection information related to the surrounding of a host vehicle or determining a required braking amount based on vehicle state information of the host vehicle, and outputting a request for the regenerative braking for the towed vehicle based on the possibility of collision or the required braking amount.

According to the exemplary embodiment of the present disclosure, the outputting may include outputting a regenerative braking entry request or an emergency regenerative braking request according to the possibility of collision or the required braking amount.

According to the exemplary embodiment of the present disclosure, the determining of the possibility of collision may include determining a time to collision (TTC) between the host vehicle and the object, and comparing the TTC to preset first and second thresholds, and the second threshold may be smaller than the first threshold.

According to the exemplary embodiment of the present disclosure, the regenerative braking entry request may be output when the TTC is smaller than or equal to the first threshold and greater than the second threshold, and the emergency regenerative braking request may be output when the TTC is smaller than or equal to the second threshold.

According to the exemplary embodiment of the present disclosure, the determining of the required braking amount may include determining the required braking amount by integrating a brake pedal displacement amount among the vehicle state information.

According to the exemplary embodiment of the present disclosure, the regenerative braking entry request may be output when the required braking amount is greater than or equal to a preset third threshold and smaller than a preset fourth threshold, and the emergency regenerative braking request may be output when the required braking amount is greater than or equal to the fourth threshold, and the third threshold is smaller than the fourth threshold.

According to the exemplary embodiment of the present disclosure, the method may further include determining a regenerative braking level corresponding to the determined TTC when the determined TTC is smaller than or equal to the first threshold and greater than the second threshold, wherein information related to the regenerative braking level may be provided to the towed vehicle together with the regenerative braking entry request.

An apparatus for controlling regenerative braking of a vehicle according to an exemplary embodiment of the present disclosure, which is mounted in a towed vehicle and configured to control regenerative braking of a host vehicle according to a request from a towing vehicle including a first control unit configured to receive a regenerative braking request from the towing vehicle and output a request corresponding to the regenerative braking request, and a second control unit configured to perform regenerative braking according to the request output from the first control unit, wherein the regenerative braking request includes a regenerative braking entry request or an emergency regenerative braking request.

According to the exemplary embodiment of the present disclosure, the first control unit may provide the information related to the regenerative braking level provided at the time of the regenerative braking entry request to the second control unit so that the second control unit is configured to perform regenerative braking according to the information related to the regenerative braking level.

According to the exemplary embodiment of the present disclosure, the first control unit may receive the regenerative braking request after receiving a towing mode from the towing vehicle to enter an enable state.

According to the exemplary embodiment of the present disclosure, the first control unit may be configured to determine whether the regenerative braking release request is received when not receiving the regenerative braking request for a preset time.

A method for controlling regenerative braking of a vehicle according to an exemplary embodiment of the present disclosure, which controls regenerative braking of a host vehicle according to a request from a towing vehicle by a control device mounted in a towed vehicle including receiving a regenerative braking request from the towing vehicle, and performing regenerative braking according to the regenerative braking request, wherein the regenerative braking request includes a regenerative braking entry request or an emergency regenerative braking request.

According to the exemplary embodiment of the present disclosure, the performing may include performing regenerative braking according to information related to a regenerative braking level provided at the time of the regenerative braking entry request when the regenerative braking entry request is received.

According to the exemplary embodiment of the present disclosure, the method may further include receiving a towing mode from the towing vehicle and entering an enable state before the receiving.

According to the exemplary embodiment of the present disclosure, the method may further include determining whether the regenerative braking release request is received when the regenerative braking request is not received for a preset time.

A system for controlling regenerative braking between vehicles according to an exemplary embodiment of the present disclosure includes a first regenerative braking control apparatus mounted in a towing vehicle, and a second regenerative braking control apparatus mounted in a towed vehicle, wherein the first regenerative braking control apparatus is configured to determine a possibility of collision with an object based on detection information related to the surrounding of a host vehicle or is configured to determine a required braking amount based on vehicle state information of the host vehicle and outputs a regenerative braking request to the towed vehicle based on the possibility of collision or the required braking amount, and the second regenerative braking control apparatus is configured to perform regenerative braking of the host vehicle according to the regenerative braking request output from the first regenerative braking control apparatus.

A method of controlling regenerative braking of a towed vehicle by a towing vehicle according to an exemplary embodiment of the present disclosure includes outputting, by a first regenerative braking control apparatus of the towing vehicle, a regenerative braking request to the towed vehicle based on a result of determining a possibility of collision with an object based on detection information related to the surrounding of a host vehicle or a result of determining a required braking amount based on vehicle state information of the host vehicle, and performing, by a second regenerative braking control apparatus of the towed vehicle, the regenerative braking of the host vehicle according to the regenerative braking request.

Detailed items according to various examples of the present disclosure other than the above-described configuration are included in the following description and the accompanying drawings.

According to the exemplary embodiments of the present disclosure, it is possible to provide the technology of controlling the regenerative braking between two different vehicles.

According to the technology of controlling the regenerative braking according to the exemplary embodiments of the present disclosure, it is possible to provide the apparatus and the method for controlling the regenerative braking implemented in the towing vehicle to control the regenerative braking of the towed vehicle.

According to the technology of controlling the regenerative braking according to the exemplary embodiments of the present disclosure, it is possible to provide the apparatus and the method for controlling the regenerative braking implemented in the towed vehicle to control the regenerative braking of the host vehicle in response to the request from the towing vehicle.

According to the technology of controlling the regenerative braking according to the exemplary embodiments of the present disclosure, it is possible to provide the system and the method for controlling the regenerative braking between the vehicles including the apparatus for controlling the regenerative braking in the towing vehicle and the apparatus for controlling the regenerative braking in the towed vehicle.

When the towing vehicle determines the unexpected situation such as a collision using the technology of controlling the regenerative braking provided according to the embodiments, the towing vehicle may provide the regenerative braking request to the towed vehicle so that the towed vehicle performs regenerative control.

When the braking force for the towed vehicle occurs in the towed vehicle, the braking force of the towing vehicle may be directly and effectively applied to the towed vehicle compared to the case of generating the braking force for the towed vehicle.

Therefore, since the force of the towed vehicle acting as the burden on the towing vehicle is reduced, the towing vehicle can secure the longer safe distance and reduce the frontal collision possibility.

Because the braking force for the towed vehicle is generated directly from the towed vehicle, the apparatus for generating the braking force for the towed vehicle does not need to be provided in the towing vehicle, and thus it is possible to relieve the economic burden caused by purchasing and installing the apparatus and reduce the manufacturing cost of the vehicle.

Furthermore, according to the technology of controlling the regenerative braking according to the exemplary embodiments of the present disclosure, since the regenerative control of the vehicle may increase the braking force step by step according to the degree of possibility of the collision, it is possible to achieve the smooth deceleration and reduce the displeasure felt by the passenger due to the sudden deceleration.

The effects of the present disclosure are not limited to the above-described effects, and other effects that are not mentioned will be able to be clearly understood by those skilled in the art from the following description.

Since the above-described objects, solutions to the problems, and effects do not specify the essential features of the claims, the scope of the claims is not limited by the items described in the contents of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
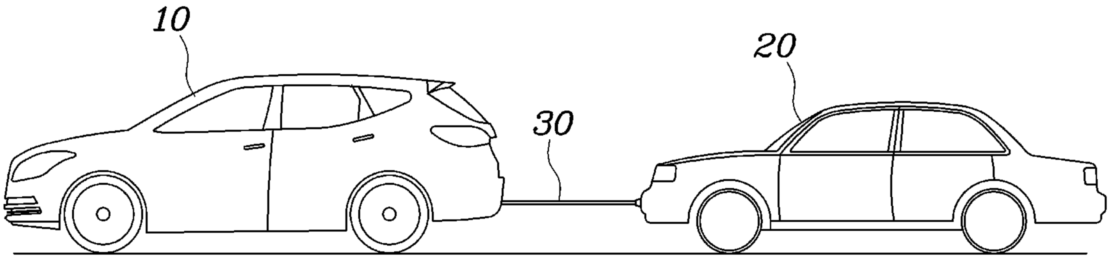
FIG. 1 is a view exemplarily illustrating a towing example between vehicles to which a system for controlling regenerative braking between the vehicles according to an exemplary embodiment of the present disclosure is applied.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Advantages and features of the present disclosure and methods for achieving them will become clear with reference to various exemplary embodiments described below in detail. However, the present disclosure is not limited to the exemplary embodiments disclosed below but may be implemented in various different forms, these embodiments are merely provided to make the present disclosure of the present disclosure complete and fully inform those skilled in the art to which the present disclosure pertains of the scope of the present disclosure, and the present disclosure is only defined by the scope of the appended claims.

Because shapes, sizes, ratios, angles, numbers, and the like disclosed in the drawings for describing the exemplary embodiments of the present disclosure are illustrative, the present disclosure is not limited to the illustrated items. The same reference number indicates the same components throughout the specification. In addition, in describing the present disclosure, when it is determined that the detailed description of a related known technology may unnecessarily obscure the gist of the present disclosure, detailed description thereof will be omitted. When terms "comprises," "has," "consists of," and the like described in the specification are used, other parts may be added unless "only" is used. When a component is expressed in the singular, it includes a case in which the component is provided as a plurality of components unless specifically stated otherwise.

In construing a component, the component is construed as including the margin of error even when there is no separate explicit description about the margin of error.

When the temporal relationship is described, when the temporal relationship is described using the term "after," "subsequently," "then," "before," or the like, it may also include a non-consecutive case unless the term "immediately" or "directly" is used.

Although terms such as first, second, and the like are used to describe various components, these components are not limited by these terms. These terms are only used to distinguish one component from another component. Therefore, a first component described below may be a second component within the technical spirit of the present disclosure.

Terms, such as first, second, A, B, (a), and (b) may be used to describe components of the present disclosure. These terms are only for distinguishing one component from another component, and the nature, sequence, order, or the like of the corresponding component is not limited by these terms. When a first component is described as being "connected," "coupled," or "joined" to a second component, the first component may be connected or joined directly to the second component, but it should be understood that a third component may be "interposed" between the first and second components, which may be connected or coupled indirectly, unless otherwise stated specially.

It should be understood that the term "at least one" includes any combination of one or more of associated components. For example, the term "at least one of first, second, and third components" may include not only the first, second, or third component, but also any combination of two or more of the first, second, and third components.

Features of various embodiments of the present specification may be coupled or combined partially or entirely, and various technological interworking and driving are possible, and the exemplary embodiments of the present disclosure may be implemented independently of each other or implemented together in an associated relationship.

Hereinafter, the present disclosure will be described through the accompanying drawings and embodiments. Scales of components illustrated in the drawings differ from the actual scale for convenience of description, and thus are not limited to the scales illustrated in the drawings.

Hereinafter, an apparatus and a method for controlling regenerative braking of a vehicle, and a system and a method for controlling regenerative braking between vehicles according to various exemplary embodiments of the present disclosure will be described with reference to the accompanying drawings.

Figure 2:
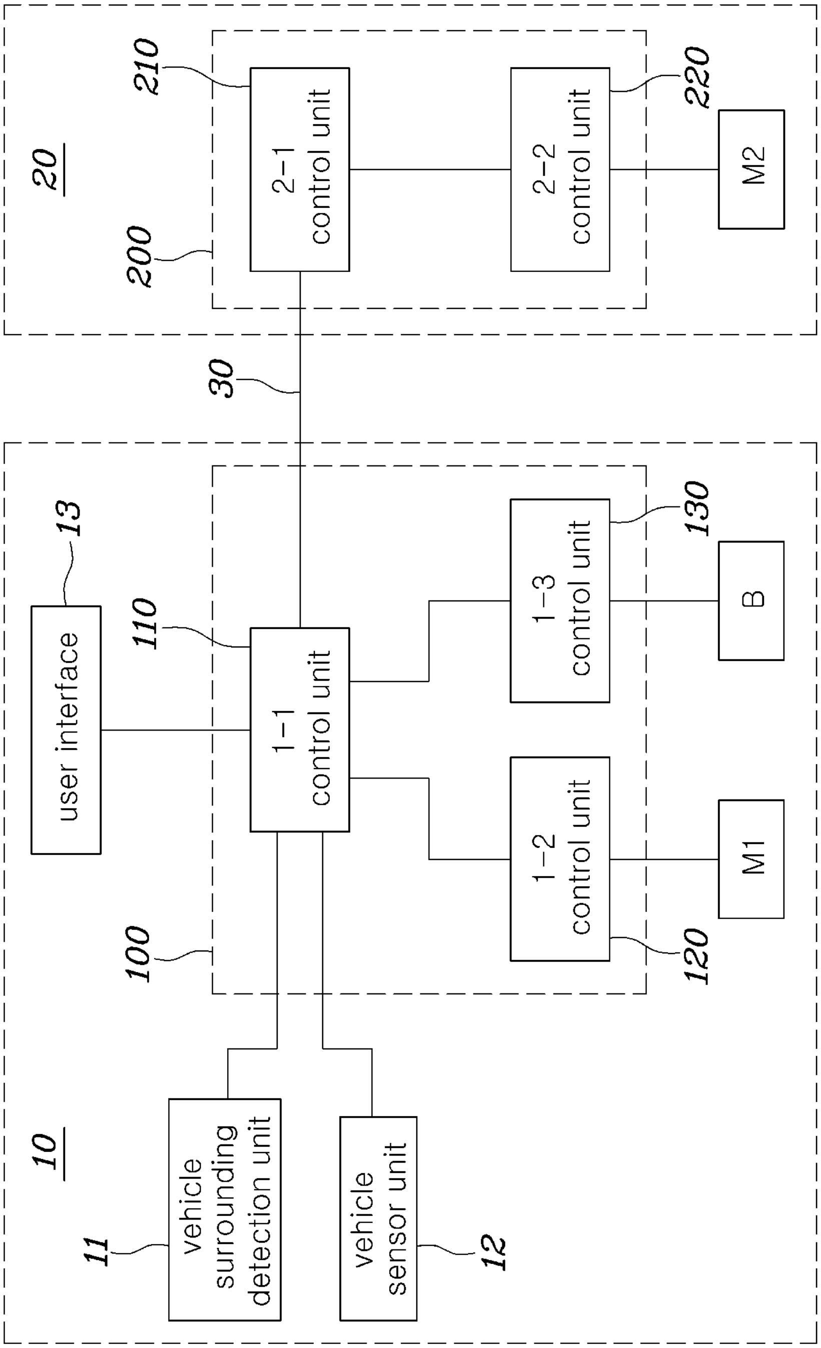
FIG. 2 is a view exemplarily illustrating a configuration of the system for controlling the regenerative braking between the vehicles according to the exemplary embodiment of the present disclosure.

FIG. 1 is a view exemplarily illustrating a towing example between vehicles to which a system for controlling regenerative braking between the vehicles according to an exemplary embodiment of the present disclosure is applied, and FIG. 2 is a view exemplarily illustrating a configuration of the system for controlling the regenerative braking between the vehicles according to the exemplary embodiment of the present disclosure.

Referring to FIG. 1 and FIG. 2, a system for controlling regenerative braking between vehicles according to an exemplary embodiment of the present disclosure may include a regenerative braking control apparatus 100 mounted on a first vehicle 10 and a regenerative braking control apparatus 200 mounted on a second vehicle 20.

For example, the first vehicle 10 may be a vehicle that tows another vehicle ("towing vehicle"), and the second vehicle 20 may be a vehicle which is towed by another vehicle ("towed vehicle").

For convenience of description, the regenerative braking control apparatus 100 mounted on the first vehicle 10 is referred to as "first regenerative braking control apparatus," and the regenerative braking control apparatus 200 mounted on the second vehicle 20 is referred to as "second regenerative braking control apparatus."

The first vehicle 10 and the second vehicle 20 may be connected by a towing connector 30, and the towing connector 30 may support communication between the first regenerative braking control apparatus 100 and the second regenerative braking control apparatus 200.

For example, the towing connector 30 may support communication between the first regenerative braking control apparatus 100 and the second regenerative braking control apparatus 200 based on controller area network (CNN) communication, and a communication method of the towing connector 30 is not limited thereto.

According to an exemplary embodiment of the present disclosure, when the towing connector 30 does not support communication, the first regenerative braking control apparatus 100 and the second regenerative braking control apparatus 200 may communicate using a separate communication device. For example, the separate communication device may comprise a vehicle-to-vehicle (V2V) communication module, and a type of the separate communication device is not limited thereto.

According to the exemplary embodiment of the present disclosure, a device for providing information necessary for the first regenerative braking control apparatus 100 to perform an operation may be further provided in the first vehicle 10. For example, a vehicle surrounding detection unit 11 and a vehicle sensor unit 12 may be further provided in the first vehicle 10.

The vehicle surrounding detection unit 11 may detect objects around the vehicle (e.g., in front of the vehicle). For example, the object may be expressed as an obstacle, object, target, or the like.

According to the exemplary embodiment of the present disclosure, the vehicle surrounding detection unit 11 may detect objects in front of the vehicle (including a front, a right front, and a left front) and provide relative information (e.g., a relative distance or a relative speed) with the detected object.

The vehicle surrounding detection unit 11 may output (or provide) detection information to the first regenerative braking control apparatus 100. For example, the detection information may include whether a front object is detected and the relative information with the object, and the information included in the detection information is not limited thereto.

For example, the vehicle surrounding detection unit 11 may include a radio detection and ranging (RADAR) sensor, a light detection and ranging (LiDAR) sensor, an infrared sensor, an ultrasonic sensor, a camera, or the like, and a configuration of the vehicle surrounding detection unit 11 is not limited thereto.

For example, the vehicle sensor unit 12 may obtain (or collect) state information of the vehicle through a vehicle network such as Controller Area Network (CAN), Local Interconnect Network (LIN), or FlexRay.

For example, the vehicle sensor unit 12 may obtain an acceleration, an angular velocity, a steering angle of a steering wheel, a yaw rate, an engine torque, a brake air pressure, a tire air pressure, an engine revolutions per minute (RPM), a vehicle weight, a brake pedal displacement, or the like, and the information obtained by the vehicle sensor unit 12 is not limited thereto.

For example, the vehicle sensor unit 12 may include a vehicle speed sensor, a wheel speed sensor, a longitudinal/transverse acceleration sensor, a master cylinder pressure sensor, a steering angle detection sensor, a steering speed detection sensor, a vehicle weight sensor, a brake pedal sensor, or the like, and a configuration of the vehicle sensor unit 12 is not limited thereto.

The vehicle sensor unit 12 may output (or provide) the obtained vehicle state information to the first regenerative braking control apparatus 100.

According to the exemplary embodiment of the present disclosure, a user interface 13 for outputting information provided from the first regenerative braking control apparatus 100 or receiving setting information from outside thereof may be further provided in the first vehicle 10.

For example, the user interface 13 may include a head unit, and an implementation example of the user interface 13 is not limited thereto.

The user interface 13 is a component configured for outputting electrical signals according to the on or off operations in the vehicle, through which the driver can selectively manipulate the on or off operations in the vehicle, and may include, for example, an operating device such as a button or switch provided in the vehicle, an input device of an Audio, Video and Navigation (AVN) system, or a touchscreen.

The user interface 13 may receive mode information, and the mode information input through the user interface 13 may be provided to the first regenerative braking control apparatus 100 and the second regenerative braking control apparatus 200.

According to the exemplary embodiment of the present disclosure, the user interface 13 may receive a towing mode and provide information related to the received towing mode to the first regenerative braking control apparatus 100.

Furthermore, the user interface 13 may provide the information related to the received towing mode to the second regenerative braking control apparatus 200.

Optionally, the first regenerative braking control apparatus 100 may transmit the mode information provided from the user interface 13 to the second regenerative braking control apparatus.

The user interface 13 may output warning or situation information based on the information provided from the first regenerative braking control apparatus 100.

According to the exemplary embodiment of the present disclosure, the user interface 13 may warn a driver of a risk of collision, output that the towing mode is being executed, output that an emergency braking function is being executed, or output that the vehicle is in a stopped state, and the warnings or information output through the user interface 13 are not limited thereto.

For example, the user interface 13 may output a warning message on a screen or output the warning message or a warning sound as a sound.

According to the exemplary embodiment of the present disclosure, the first regenerative braking control apparatus 100 may be configured to determine the possibility of collision with the front object based on the input information and output a regenerative braking request to the second regenerative braking control apparatus 200 when there is the possibility of collision.

For example, the first regenerative braking control apparatus 100 may output the regenerative braking request to the second regenerative braking control apparatus 200 through the towing connector 30.

The first regenerative braking control apparatus 100 may output a regenerative braking entry request to the second regenerative braking control apparatus 200 or output an emergency regenerative braking request to the second regenerative braking control apparatus 200 according to a degree of the possibility of collision.

For example, to determine the possibility of collision, the first regenerative braking control apparatus 100 may be configured to determine a time-to-collision (TTC) between a host vehicle 10 and the front object based on the detection information provided from the vehicle surrounding detection unit 11.

The first regenerative braking control apparatus 100 may output the regenerative braking entry request to the second regenerative braking control apparatus 200 when the determined TTC is smaller than or equal to a first threshold.

Furthermore, the first regenerative braking control apparatus 100 may output the emergency regenerative braking request to the second regenerative braking control apparatus 200 when the determined TTC is smaller than or equal to a second threshold smaller than the first threshold.

Therefore, the first regenerative braking control apparatus 100 may request a regenerative braking entry to the second regenerative braking control apparatus 200 when the TTC is smaller than or equal to the first threshold and request the emergency regenerative braking to the second regenerative braking control apparatus 200 when the TTC is smaller than or equal to the second threshold.

According to the exemplary embodiment of the present disclosure, when the TTC includes a value between the first threshold and the second threshold, the first regenerative braking control apparatus 100 may be configured to determine a regenerative braking level according to the value of the TTC.

To the present end, the first regenerative braking control apparatus 100 may store a lookup table (LUT) including information related to a regenerative braking level for each preset TTC value through a vehicle braking test.

For example, the regenerative braking level may be expressed as a required braking force corresponding to the TTC value. Therefore, the first regenerative braking control apparatus 100 may provide the required braking force while requesting the regenerative braking entry to the second regenerative braking control apparatus 200.

The first regenerative braking control apparatus 100 may provide the information related to the regenerative braking level to the second regenerative braking control apparatus 200 at the time of the regenerative braking entry request so that the second regenerative braking control apparatus 200 performs the regenerative braking on the host vehicle 20.

According to the exemplary embodiment of the present disclosure, the first regenerative braking control apparatus 100 may perform the regenerative braking of the host vehicle 10 and perform the emergency braking of the host vehicle 10.

The first regenerative braking control apparatus 100 may perform the regenerative braking of the host vehicle 10 when the TTC is smaller than or equal to the first threshold and perform the emergency braking of the host vehicle 10 when the TTC is smaller than or equal to the second threshold.

When performing the regenerative braking on the host vehicle 10, the first regenerative braking control apparatus 100 may perform regenerative braking based on the determined regenerative braking level.

The first regenerative braking control apparatus 100 may continuously determine the possibility of collision with the front object (i.e., the TTC) based on the input detection information until the towing mode is canceled.

The first regenerative braking control apparatus 100 may be configured to determine the regenerative braking level whenever determining the possibility of collision with the front object.

The first regenerative braking control apparatus 100 may be implemented not to output the regenerative braking request to the second regenerative braking control apparatus 200 when the TTC exceeds the first threshold.

The first regenerative braking control apparatus 100 may request the regenerative braking (regenerative braking entry or emergency regenerative braking) to the second regenerative braking control apparatus 200, and then output a regenerative braking release request to the second regenerative braking control apparatus 200 when the TTC exceeds the first threshold through later determination.

After requesting the regenerative braking entry to the second regenerative braking control apparatus 200, the first regenerative braking control apparatus 100 may request the emergency regenerative braking to the second regenerative braking control apparatus 200 when the TTC is smaller than or equal to the second threshold through later determination.

After performing the regenerative braking or emergency braking on the host vehicle 10, the first regenerative braking control apparatus 100 may release the regenerative braking or emergency braking for the host vehicle 10 when the TTC exceeds the first threshold through later determination.

When the first regenerative braking control apparatus 100 determines that the host vehicle 10 has stopped based on the vehicle state information provided from the vehicle sensor unit 12, the first regenerative braking control apparatus 100 may request the regenerative braking release to the second regenerative braking control apparatus 200.

When the first regenerative braking control apparatus 100 determines that the host vehicle 10 has stopped based on the vehicle state information provided from the vehicle sensor unit 12, the first regenerative braking control apparatus 100 may release the regenerative braking or emergency braking for the host vehicle 10.

The first regenerative braking control apparatus 100 may output a warning or information through the user interface 13.

When the first regenerative braking control apparatus 100 determines that there is the possibility of collision with the front object, the first regenerative braking control apparatus 100 may output and warn the possibility of collision through the user interface 13.

When the first regenerative braking control apparatus 100 determines that the emergency braking is needed, the first regenerative braking control apparatus 100 may output the execution of an emergency braking function through the user interface 13.

When the first regenerative braking control apparatus 100 determines that the host vehicle 10 has stopped, the first regenerative braking control apparatus 100 may output the stopped state of the host vehicle 10 through the user interface 13.

According to the exemplary embodiment of the present disclosure, the first regenerative braking control apparatus 100 may include a 1-1 control unit 110, a 1-2 control unit 120, and a 1-3 control unit 130, and a configuration of the regenerative braking control apparatus 100 is not limited thereto. For example, the first regenerative braking control apparatus 100 may include a receiving unit for receiving information provided externally. For example, the first regenerative braking control apparatus 100 may receive detection information provided from the vehicle surrounding detection unit 11 and the vehicle state information provided from the vehicle sensor unit 12 through the receiving unit.

The 1-1 control unit 110 may be configured to determine the possibility of collision with the front object based on the input information.

For example, the 1-1 control unit 110 may include a hybrid control unit (HCU), a vehicle control unit (VCU), or an electronic control unit (ECU).

The 1-1 control unit 110 may communicate with the second regenerative braking control apparatus 200 through the towing connector 30. The 1-1 control unit 110 may communicate with the 2-1 control unit 210 of the second regenerative braking control apparatus 200.

The 1-1 control unit 110 may receive the towing mode as mode information from the user interface 13 and request the regenerative braking for the towed vehicle 20 to the second regenerative braking control apparatus 200 when there is the possibility of collision with the front object.

The 1-1 control unit 110 may be configured to determine the TTC between the host vehicle 10 and the front object based on the detection information provided from the vehicle surrounding detection unit 11.

When the determined TTC is smaller than or equal to the first threshold, the 1-1 control unit 110 may request the regenerative braking entry to the second regenerative braking control apparatus 200.

Furthermore, the 1-1 control unit 110 may request the emergency regenerative braking to the second regenerative braking control apparatus 200 when the determined TTC is smaller than or equal to the second threshold smaller than the first threshold.

The 1-1 control unit 110 may continuously determine the possibility of collision with the front object based on the input detection information until the towing mode is canceled.

When the TTC includes a value between the first threshold and the second threshold, the 1-1 control unit 110 may be configured to determine the regenerative braking level according to the value of the TTC.

To the present end, the 1-1 control unit 110 may store the look-up table (LUT) including the information related to the regenerative braking level for each preset TTC value through the vehicle braking test in a memory.

The 1-1 control unit 110 may provide the information related to the regenerative braking level to the second regenerative braking control apparatus 200 at the time of the regenerative braking entry request so that the second regenerative braking control apparatus 200 performs the regenerative braking on the host vehicle 20.

The 1-1 control unit 110 may request the regenerative braking (regenerative braking entry or emergency regenerative braking) to the second regenerative braking control apparatus 200, and then output the regenerative braking release request to the second regenerative braking control apparatus 200 when the TTC exceeds the first threshold through later determination.

After requesting the regenerative braking entry to the second regenerative braking control apparatus 200, the 1-1 control unit 110 may request the emergency regenerative braking to the second regenerative braking control apparatus 200 when the TTC is smaller than or equal to the second threshold through later determination.

When the 1-1 control unit 110 determines that the host vehicle 10 has stopped based on the vehicle state information provided from the vehicle sensor unit 12, the 1-1 control unit 110 may request the regenerative braking release to the second regenerative braking control apparatus 200.

When the TTC is smaller than or equal to the first threshold, the 1-1 control unit 110 may be configured for controlling the 1-2 control unit 120 to perform the regenerative braking of the host vehicle 10. Furthermore, when the TTC is smaller than or equal to the second threshold, the 1-1 control unit 110 may be configured for controlling the 1-3 control unit 130 to perform the emergency braking of the host vehicle 10.

The 1-1 control unit 110 may output the regenerative braking request to the 1-2 control unit 120 to perform the regenerative braking of the host vehicle 10. Here, the 1-1 control unit 110 may provide the information related to the regenerative braking level together with the regenerative braking request.

The 1-1 control unit 110 may output the emergency braking request to the 1-3 control unit 130 to perform the emergency braking of the host vehicle 10.

After performing the regenerative braking or emergency braking on the host vehicle 10, the 1-1 control unit 110 may release the regenerative braking or emergency braking for the host vehicle 10 when the TTC exceeds the first threshold through later determination.

When the 1-1 control unit 110 determines that the host vehicle 10 has stopped based on the vehicle state information provided from the vehicle sensor unit 12, the 1-1 control unit 110 may release the regenerative braking or emergency braking for the host vehicle 10.

The 1-1 control unit 110 may output the regenerative braking release request to the 1-2 control unit 120 to release the regenerative braking and output the emergency regenerative braking request to the 1-3 control unit 130 to release the emergency braking.

The 1-1 control unit 110 may output a warning or information through the user interface 13.

When the 1-1 control unit 110 determines that there is the possibility of collision with the front object, the 1-1 control unit 110 may output and warn the possibility of collision through the user interface 13.

When the 1-1 control unit 110 determines that the emergency braking is needed, the 1-1 control unit 110 may output the execution of the emergency braking function through the user interface 13.

When the 1-1 control unit 110 determines that the host vehicle 10 has stopped, the 1-1 control unit 110 may output the stopped state of the host vehicle 10 through the user interface 13.

The 1-2 control unit 120 may perform the regenerative braking on the host vehicle 10 in response to the request from the 1-1 control unit 110.

For example, the 1-2 control unit 120 may include a motor control unit (MCU).

According to the exemplary embodiment of the present disclosure, when the 1-2 control unit 120 receives the regenerative braking request from the 1-1 control unit 110, the 1-2 control unit 120 may perform regenerative braking by controlling a motor M1.

Here, the 1-2 control unit 120 may be configured for controlling the motor M1 based on the information related to the regenerative braking level provided together with the regenerative braking request.

According to the exemplary embodiment of the present disclosure, when the 1-2 control unit 120 receives the regenerative braking release request from the 1-1 control unit 110, the 1-2 control unit 120 may release the regenerative braking by controlling the motor M1.

The 1-3 control unit 130 may perform the emergency braking on the host vehicle 10 in response to the request from the 1-1 control unit 110.

For example, the 1-2 control unit 120 may include an integrated electric booster (IEB).

According to the exemplary embodiment of the present disclosure, when the 1-2 control unit 120 receives the emergency braking request from the 1-1 control unit 110, the 1-2 control unit 120 may be configured for controlling a brake B to perform emergency braking.

According to the exemplary embodiment of the present disclosure, when the 1-2 control unit 120 receives the emergency braking release request from the 1-1 control unit 110, the 1-2 control unit 120 may be configured for controlling the brake B to release the emergency braking.

The second regenerative braking control apparatus 200 may perform the regenerative braking on the host vehicle 20 in response to the request from the first regenerative braking control apparatus 100.

When the second regenerative braking control apparatus 200 receives the towing mode from the first vehicle 10, the second regenerative braking control apparatus 200 may enter an enable state in which the regenerative braking function is performed.

For example, the second regenerative braking control apparatus 200 may receive the towing mode transmitted from the user interface 13 of the first vehicle 10 or receive the towing mode transmitted from the first regenerative braking control apparatus 100 of the first vehicle 10.

According to the exemplary embodiment of the present disclosure, the second regenerative braking control apparatus 200 may receive the mode information and the regenerative braking request from the first vehicle 10 through the towing connector 30.

When the towing connector 30 does not support communication, the second regenerative braking control apparatus 200 may be provided with a separate communication device to communicate with the first regenerative braking control apparatus 100. For example, the separate communication device may comprise a vehicle-to-vehicle (V2V) communication module, and a type of the separate communication device is not limited thereto.

The second regenerative braking control apparatus 200 may receive the regenerative braking entry request or the emergency regenerative braking request from the first regenerative braking control apparatus 100 in relation to regenerative braking.

According to the exemplary embodiment of the present disclosure, the second regenerative braking control apparatus 200 may receive the information related to the regenerative braking level together with the regenerative braking entry request.

When the second regenerative braking control apparatus 200 receives the regenerative braking entry request from the first regenerative braking control apparatus 100, the second regenerative braking control apparatus 200 may perform the regenerative braking on the host vehicle 20.

When performing the regenerative braking on the host vehicle 20, the second regenerative braking control apparatus 200 may perform the regenerative braking based on the information related to the regenerative braking level provided from the first regenerative braking control apparatus 100.

When the second regenerative braking control apparatus 200 receives the emergency regenerative braking request from the first regenerative braking control apparatus 100, the second regenerative braking control apparatus 200 may perform the regenerative braking to generate a preset maximum braking force.

When the second regenerative braking control apparatus 200 receives the regenerative braking release request from the first regenerative braking control apparatus 100, the second regenerative braking control apparatus 200 may release the regenerative braking for the host vehicle 20.

According to the exemplary embodiment of the present disclosure, the second regenerative braking control apparatus 200 may be configured to determine whether a preset time has elapsed after entering the enable state.

The second regenerative braking control apparatus 200 may be configured to determine whether the regenerative braking request is received when an enable maintenance time has not elapsed a set time.

Furthermore, the second regenerative braking control apparatus 200 may be configured to determine whether the regenerative braking release request is received when it is determined that the enable maintenance time has elapsed the set time.

In other words, the second regenerative braking control apparatus 200 may be configured to determine whether the regenerative braking release request is received when the regenerative braking request is not received for a preset time.

According to the exemplary embodiment of the present disclosure, when not receiving the regenerative braking request for the preset time, the second regenerative braking control apparatus 200 may output a message indicating that the regenerative braking request has not been received for the preset time.

According to the exemplary embodiment of the present disclosure, the second regenerative braking control apparatus 200 may include a 2-1 control unit 210 and a 2-2 control unit 220.

For example, the 2-1 control unit 210 may include a HCU, a VCU, or an ECU.

For example, the 2-2 control unit 220 may include a MCU.

When the 2-1 control unit 210 receives the towing mode from the first vehicle 10, the 2-1 control unit 210 may enter the enable state in which the regenerative braking function is performed.

The 2-1 control unit 210 may receive the regenerative braking request from the first regenerative braking control apparatus 100. Here, the 2-1 control unit 210 may receive the regenerative braking entry request or emergency regenerative braking request.

According to the exemplary embodiment of the present disclosure, the 2-1 control unit 210 may receive the information related to the regenerative braking level together with the regenerative braking entry request.

When receiving the regenerative braking entry request, the 2-1 control unit 210 may output the regenerative braking request to the 2-2 control unit 220. At the instant time, the 2-1 control unit 210 may provide the information related to the regenerative braking level to the 2-2 control unit 220.

When receiving the emergency regenerative braking request, the 2-1 control unit 210 may output the emergency regenerative braking request to the 2-2 control unit 220.

When receiving the regenerative braking release request from the first regenerative braking control apparatus 100, the 2-1 control unit 210 may output the regenerative braking release request to the 2-2 control unit 220.

According to the exemplary embodiment of the present disclosure, the 2-1 control unit 210 may be configured to determine whether the preset time has elapsed after entering the enable state.

The 2-1 control unit 210 may be configured to determine whether the regenerative braking request is received when the enable maintenance time has not elapsed the set time.

Furthermore, the 2-1 control unit 210 may be configured to determine whether the regenerative braking release request is received when it is determined that the enable maintenance time has elapsed the set time.

In other words, the 2-1 control unit 210 may be configured to determine whether the regenerative braking release request is received when the regenerative braking request is not received for the preset time.

According to the exemplary embodiment of the present disclosure, when not receiving the regenerative braking request for the preset time, the 2-1 control unit 210 may output the message indicating that the regenerative braking request has not been received for the preset time.

The 2-2 control unit 220 may perform regenerative braking by controlling a motor M2 in response to the request from the 2-1 control unit 210.

The 2-2 control unit 220 may perform the regenerative braking by controlling the motor M2 based on the information related to the regenerative braking level provided together with the regenerative braking entry request from the 2-1 control unit 210.

The 2-2 control unit 220 may be configured to generate the maximum braking force by controlling the motor M2 in response to the emergency regenerative braking request from the 2-1 control unit 210.

The 2-2 control unit 220 may release the regenerative braking by controlling the motor M2 in response to the regenerative braking release request from the 2-1 control unit 210.

As described above, the example in which the 1-1 control unit 110 of the first regenerative braking control apparatus 100 mounted on the first vehicle 10 is configured to control the regenerative braking for the second vehicle 20 based on the possibility of collision with the front object has been exemplified. However, the regenerative braking control for the second vehicle 20 is not only performed based on the possibility of collision with the front object.

According to the exemplary embodiment of the present disclosure, the 1-1 control unit 110 of the first regenerative braking control apparatus 100 may be configured for controlling the regenerative braking of the second vehicle 20 based on the vehicle state information provided from the vehicle sensor unit 12.

The 1-1 control unit 110 may be configured to determine a required braking amount by integrating a brake pedal displacement amount among the vehicle state information and control the regenerative braking for the host vehicle 10 and the second vehicle 20 based on the required braking amount.

When the required braking amount is greater than or equal to a preset third threshold and smaller than a fourth threshold which is greater than the third threshold, the 1-1 control unit 110 may request the regenerative braking entry to the second regenerative braking control apparatus 200.

When the required braking amount is greater than or equal to the fourth threshold, the 1-1 control unit 110 may request the emergency regenerative braking to the second regenerative braking control apparatus 200.

The 1-1 control unit 110 may continuously determine the required braking amount based on the input brake pedal displacement amount until the towing mode is canceled.

When the required braking amount includes a value between the third threshold and the fourth threshold, the 1-1 control unit 110 may be configured to determine a regenerative braking level according to the required braking amount.

To the present end, the 1-1 control unit 110 may store a LUT including information related to a regenerative braking level for each preset required braking amount through the vehicle braking test in a memory.

The 1-1 control unit 110 may provide the regenerative braking level to the second vehicle 20 at the time of the regenerative braking entry request so that the second vehicle 20 performs regenerative braking according to the information related to the regenerative braking level.

After requesting the regenerative braking (regenerative braking entry or emergency regenerative braking) to the second vehicle 20, the 1-1 control unit 110 may output the regenerative braking release request to the second vehicle 20 when the required braking amount is smaller than the third threshold through later determination.

After requesting the regenerative braking entry to the second vehicle 20, the 1-1 control unit 110 may request the emergency regenerative braking to the second vehicle 20 when the required braking amount is greater than or equal to the fourth threshold through later determination.

Like performing the regenerative braking based on the TTC, the 1-1 control unit 110 may perform or release the regenerative braking or emergency braking for the host vehicle 10 based on the required braking amount, and detailed description thereof will be omitted.

Figure 3:
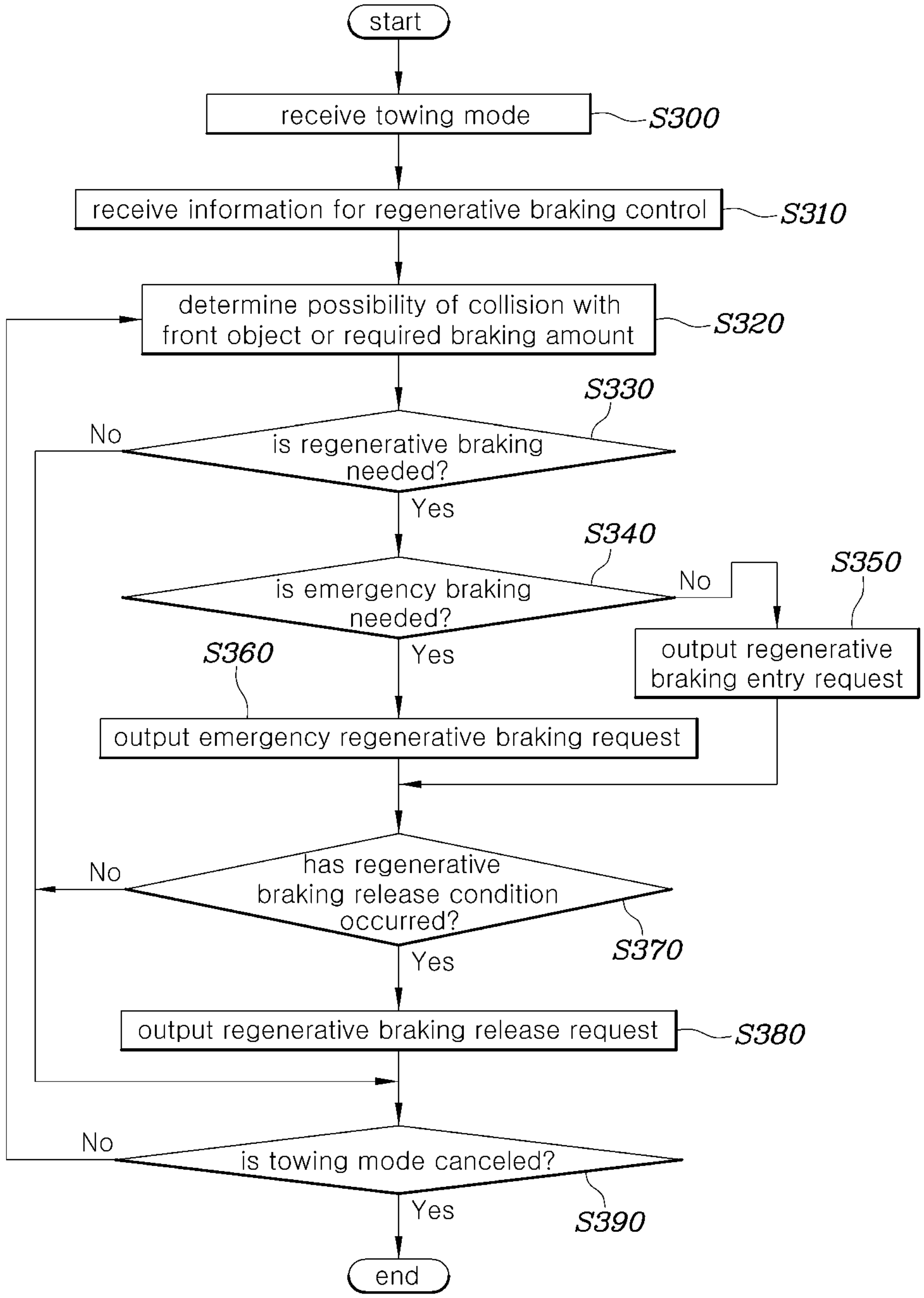
FIG. 3 is a view for describing an operation of an apparatus for controlling regenerative braking at a towing vehicle side (first regenerative braking control apparatus 100) according to the exemplary embodiment of the present disclosure.

FIG. 3 is a view for describing an operation of an apparatus for controlling regenerative braking at a towing vehicle side (first regenerative braking control apparatus 100) according to the exemplary embodiment of the present disclosure.

Step-by-step operations illustrated in FIG. 3 may be performed by the first regenerative braking control apparatus 100 described with reference to FIG. 1 and FIG. 2.

Referring to FIG. 1, FIG. 2, and FIG. 3, when receiving the towing mode (S300), the 1-1 control unit 110 may start a regenerative braking control operation related to the towed vehicle 20.

First, the 1-1 control unit 110 may receive information for regenerative braking control (S310) and determine the possibility of collision between the host vehicle 10 and the front object or determine a required braking amount based on the received information (S320).

In operation S320, the 1-1 control unit 110 may be configured to determine the possibility of collision between the host vehicle 10 and the front object based on the detection information provided from the vehicle surrounding detection unit 11.

According to the exemplary embodiment of the present disclosure, the 1-1 control unit 110 may be configured to determine the TTC between the host vehicle 10 and the front object based on the detection information.

In operation S320, the 1-1 control unit 110 may be configured to determine the required braking amount based on the brake pedal displacement amount among the vehicle state information provided from the vehicle sensor unit 12.

According to the exemplary embodiment of the present disclosure, the 1-1 control unit 110 may be configured to determine the required braking amount by integrating the brake pedal displacement amount.

Furthermore, the 1-1 control unit 110 may be configured to determine whether regenerative braking is needed based on the determined possibility of collision (here, the TTC) or the required braking amount (S330).

In operation S330, the 1-1 control unit 110 may be configured to determine whether the determined TTC is smaller than or equal to the first threshold or determine whether the determined required braking amount is greater than or equal to the third threshold.

In operation S330, when it is determined that the regenerative braking is not needed (NO in S330), that is, when the TTC is greater than the first threshold or the required braking amount is smaller than the third threshold, the 1-1 control unit 110 may be configured to determine whether the towing mode has been canceled (S390).

In operation S330, when it is determined that the regenerative braking is needed (YES in S330), that is, when the TTC is smaller than or equal to the first threshold or the required braking amount is greater than or equal to the third threshold, the 1-1 control unit 110 may be configured to determine the possibility of collision (here, the TTC) or whether the emergency braking is needed based on the required braking amount (S340).

In operation S340, the 1-1 control unit 110 may be configured to determine whether the TTC is smaller than or equal to the second threshold which is smaller than the first threshold or determine whether the required braking amount is greater than or equal to the fourth threshold which is greater than the third threshold.

In operation S340, when it is determined that the emergency regenerative braking is not needed (NO in S340), that is, when the TTC is greater than the second threshold or the required braking amount is smaller than the fourth threshold, the 1-1 control unit 110 may output the regenerative braking entry request to the towed vehicle 20 (S350).

In operation S350, the 1-1 control unit 110 may be configured to determine the regenerative braking level according to the value of the TTC or the regenerative braking level according to the value of the required braking amount and provide the information related to the regenerative braking level together while outputting the regenerative braking entry request.

Figure 6:
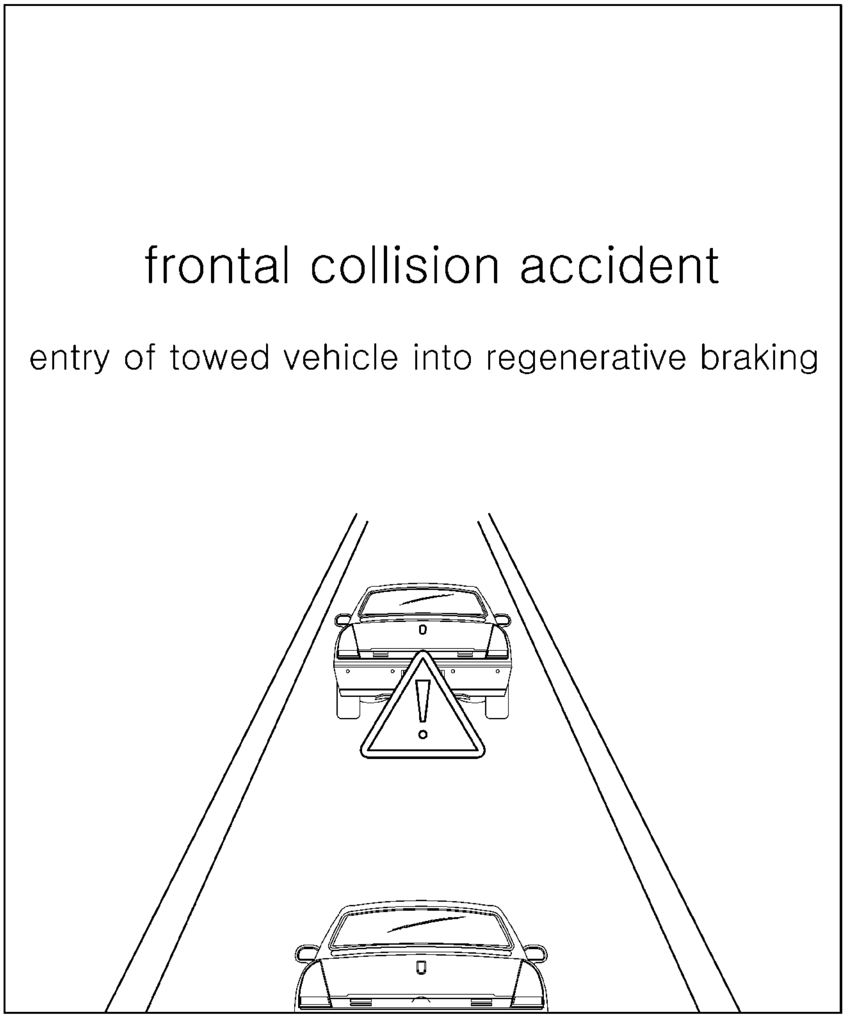
FIG. 6 is a view exemplarily illustrating an example of a screen output through a user interface 13 when it is determined that there is the possibility of collision with a front object.

In operation S350, the 1-1 control unit 110 may warn (or output) the possibility of collision through the user interface 13 and output a regenerative braking entry situation of the towed vehicle 20 through the user interface 13 (see FIG. 6).

In operation S350, the 1-1 control unit 110 may be configured to determine the regenerative braking level based on the LUT including the information related to the regenerative braking level for each TTC value or determine the regenerative braking level based on the LUT including the information related to the regenerative braking level for each required braking amount.

In operation S350, the 1-1 control unit 110 may output the regenerative braking request to the 1-2 control unit 120 for the regenerative braking of the host vehicle 10. At the instant time, the 1-1 control unit 110 may provide the information related to the regenerative braking level to the 1-2 control unit 120.

In operation S340, when it is determined that the emergency regenerative braking is needed (YES in S340), that is, when the TTC is smaller than or equal to the second threshold or the required braking amount is greater than or equal to the fourth threshold, the 1-1 control unit 110 may output the emergency regenerative braking request to the towed vehicle 20 (S360).

In operation S360, the 1-1 control unit 110 may output the emergency braking request to the 1-3 control unit 130 for the emergency braking of the host vehicle 10.

Figure 7:
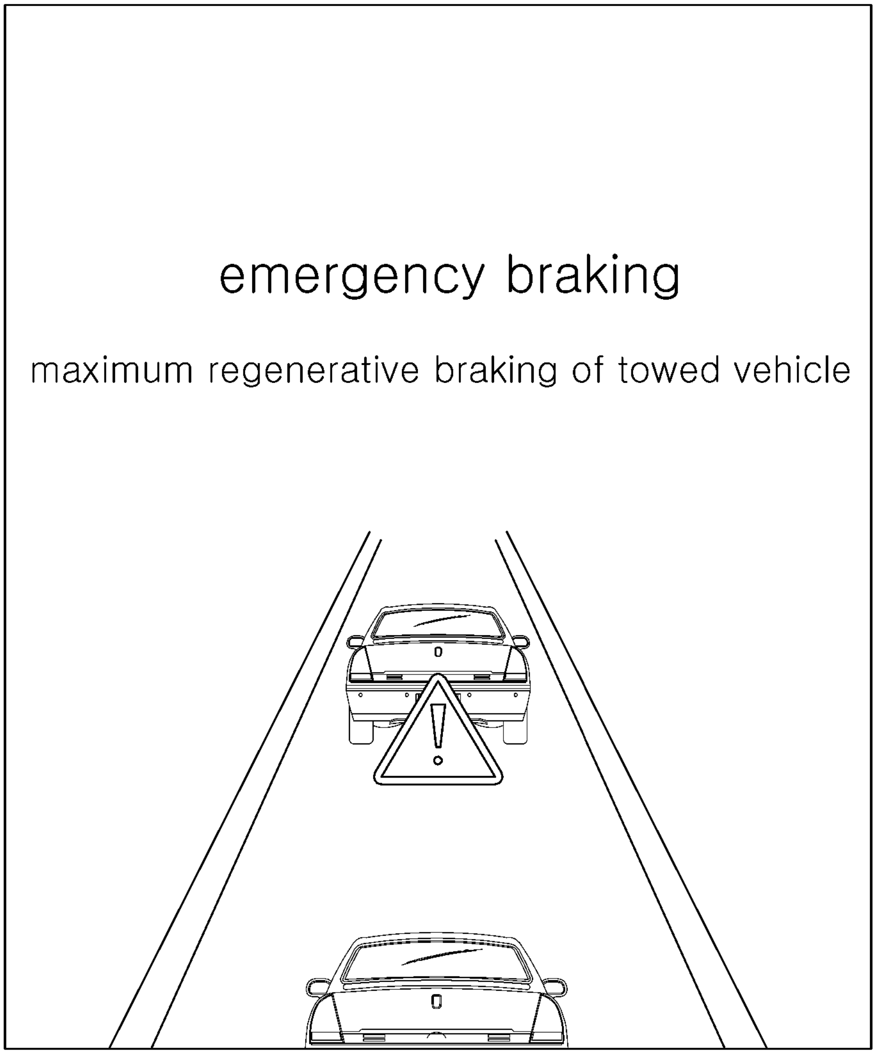
FIG. 7 is a view exemplarily illustrating an example of a screen output through the user interface 13 when it is determined that sudden braking is required.

In operation S360, the 1-1 control unit 110 may output the execution of the emergency braking through the user interface 13 and output a situation in which the maximum regenerative braking of the towed vehicle 20 is performed through the user interface 13 (see FIG. 7).

After operation S350 or S360, the 1-1 control unit 110 may be configured to determine whether a regenerative braking release condition has occurred (S370).

In operation S370, when determining that the host vehicle 10 is in a stopped state based on the vehicle state information provided from the vehicle sensor unit 12, the 1-1 control unit 110 may be configured to determine that the regenerative braking release condition has occurred.

In operation S370, when it is determined that the regenerative braking release condition has not occurred (NO in S370), the 1-1 control unit 110 may be configured to determine whether the towing mode has been canceled (S390).

In operation S370, when it is determined that the regenerative braking release condition has occurred (YES in S370), the 1-1 control unit 110 may output the regenerative braking release request to the towed vehicle 20 (S380).

In operation S380, the 1-1 control unit 110 may output the regenerative braking release request to the 1-2 control unit 120 or output the emergency braking release request to the 1-3 control unit 130.

Figure 8:
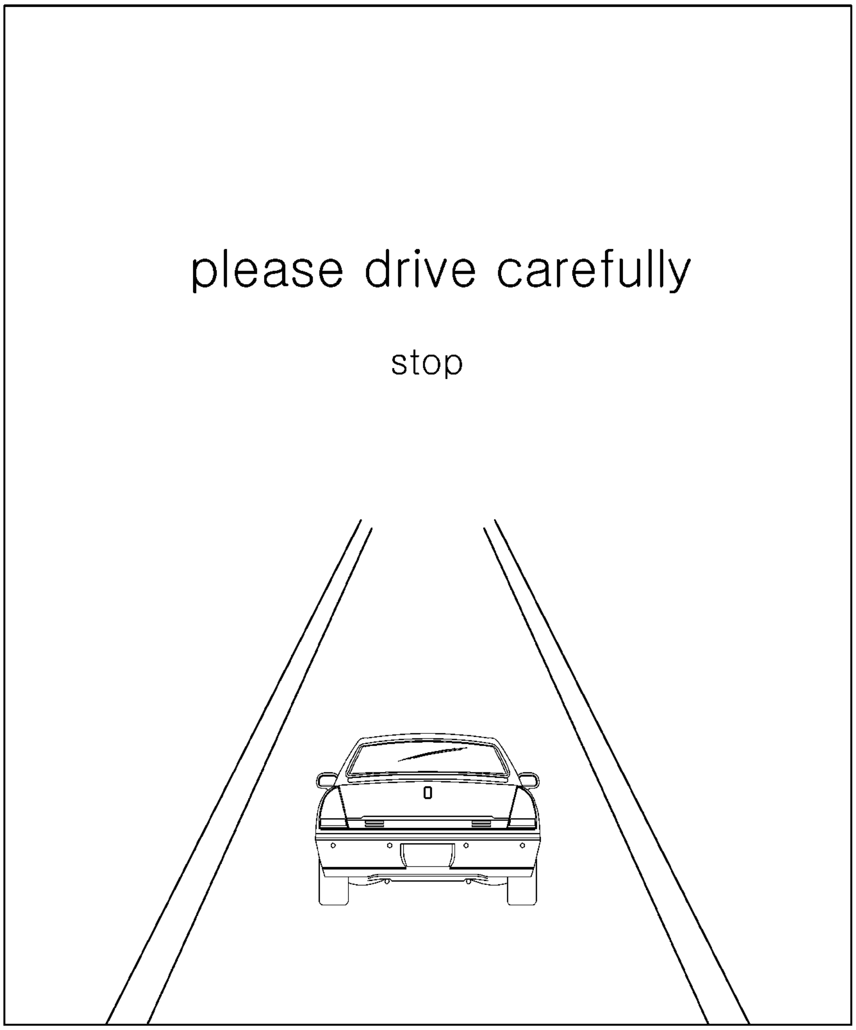
FIG. 8 is a view exemplarily illustrating an example of a screen output through the user interface 13 when the towing vehicle is stopped.

In operation S380, the 1-1 control unit 110 may output the stopped state of the host vehicle 10 through the user interface 13 (see FIG. 8).

Figure 4:
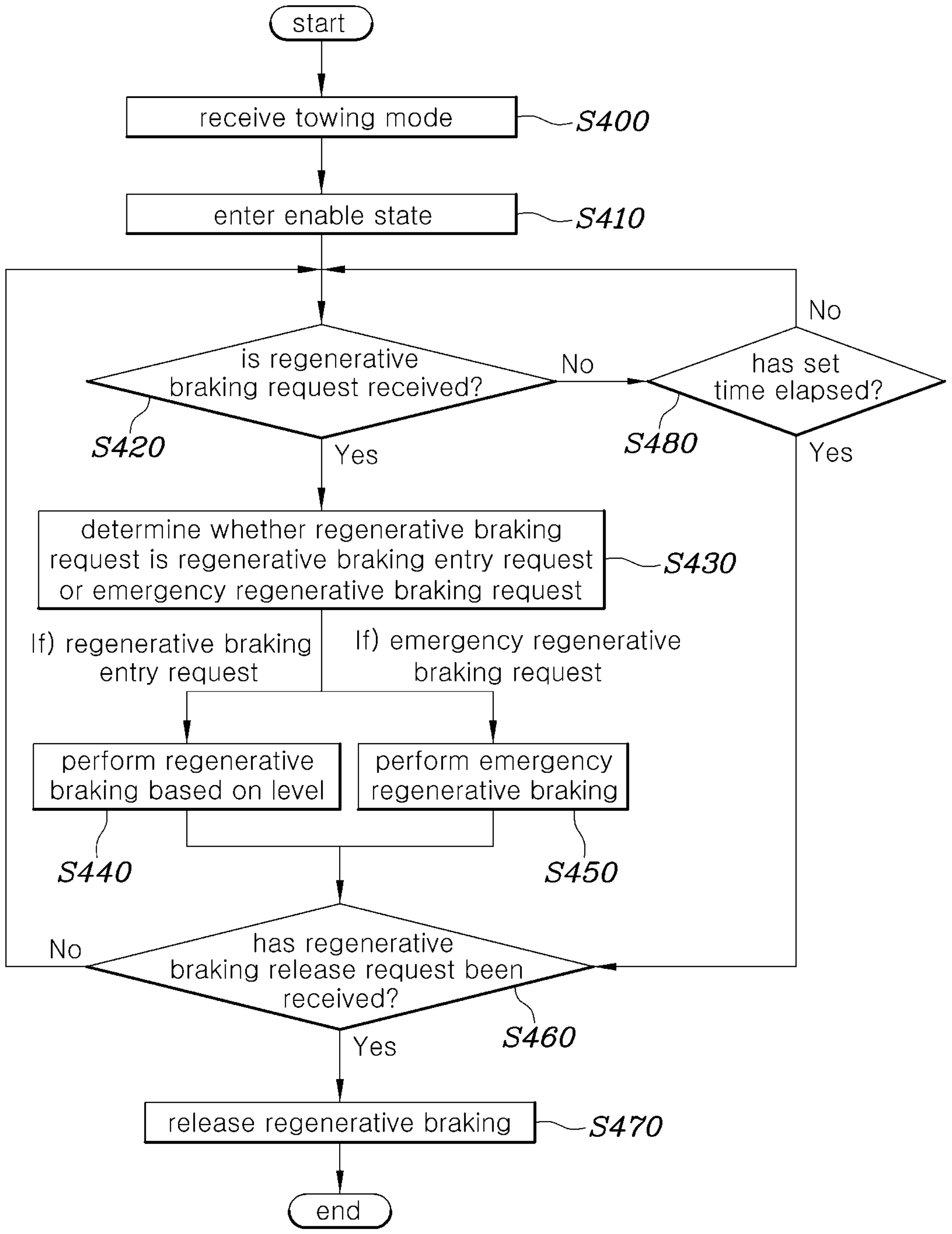
FIG. 4 is a view for describing an operation of an apparatus for controlling regenerative braking at a towed vehicle side (second regenerative braking control apparatus 200) according to the exemplary embodiment of the present disclosure.

FIG. 4 is a view for describing an operation of an apparatus for controlling regenerative braking at a towed vehicle side (second regenerative braking control apparatus) according to the exemplary embodiment of the present disclosure.

Step-by-step operations illustrated in FIG. 4 may be performed by the second regenerative braking control apparatus 200 described with reference to FIG. 1 and FIG. 2.

Referring to FIGS. 1, 2, and 4, when receiving the towing mode (S400), the 2-1 control unit 210 may enter the enable state to perform the regenerative braking control operation for the host vehicle 20 (S410).

Then, the 2-1 control unit 210 may be configured to determine whether the regenerative braking request has been received (S420).

When receiving the regenerative braking request (YES in S420), the 2-1 control unit 210 may be configured to determine whether the regenerative braking request is the regenerative braking entry request or emergency regenerative braking request (S430).

When the regenerative braking request is the regenerative braking entry request, the 2-1 control unit 210 may output the regenerative braking entry request to the 2-2 control unit 220 so that the regenerative braking of the host vehicle 20 is performed by the 2-2 control unit 220 (S440).

In operation S440, the 2-1 control unit 210 may provide the information related to the regenerative braking level to the 2-2 control unit 220 so that the 2-2 control unit 220 performs the regenerative braking based on the information related to the regenerative braking level.

Furthermore, when the regenerative braking request is the emergency regenerative braking request, the 2-1 control unit 210 may output the emergency regenerative braking request to the 2-2 control unit 220 so that the emergency regenerative braking of the host vehicle 20 is performed by the 2-2 control unit 220 (S450).

Then, the 2-1 control unit 210 may be configured to determine whether the regenerative braking release request has been received (S460).

In operation S460, when receiving the regenerative braking release request (YES in S460), the 2-1 control unit 210 may release the regenerative braking (S470), and when not receiving the regenerative braking release request (NO in S460) the 2-1 control unit 210 may be configured to determine whether the regenerative braking request is received (S420).

Meanwhile, when determining that the regenerative braking request has not been received in operation S420 (NO in S420), the 2-1 control unit 210 may be configured to determine whether the preset time has elapsed after entering the enable state (S480).

In operation S480, when determining that the enable maintenance time has not elapsed the set time (NO in S480), the 2-1 control unit 210 may be configured to determine whether the regenerative braking request is received (S420).

In operation S480, when determining that the enable maintenance time has elapsed the set time (YES in S480), the 2-1 control unit 210 may be configured to determine whether the regenerative braking release request is received (S460).

Figure 5:
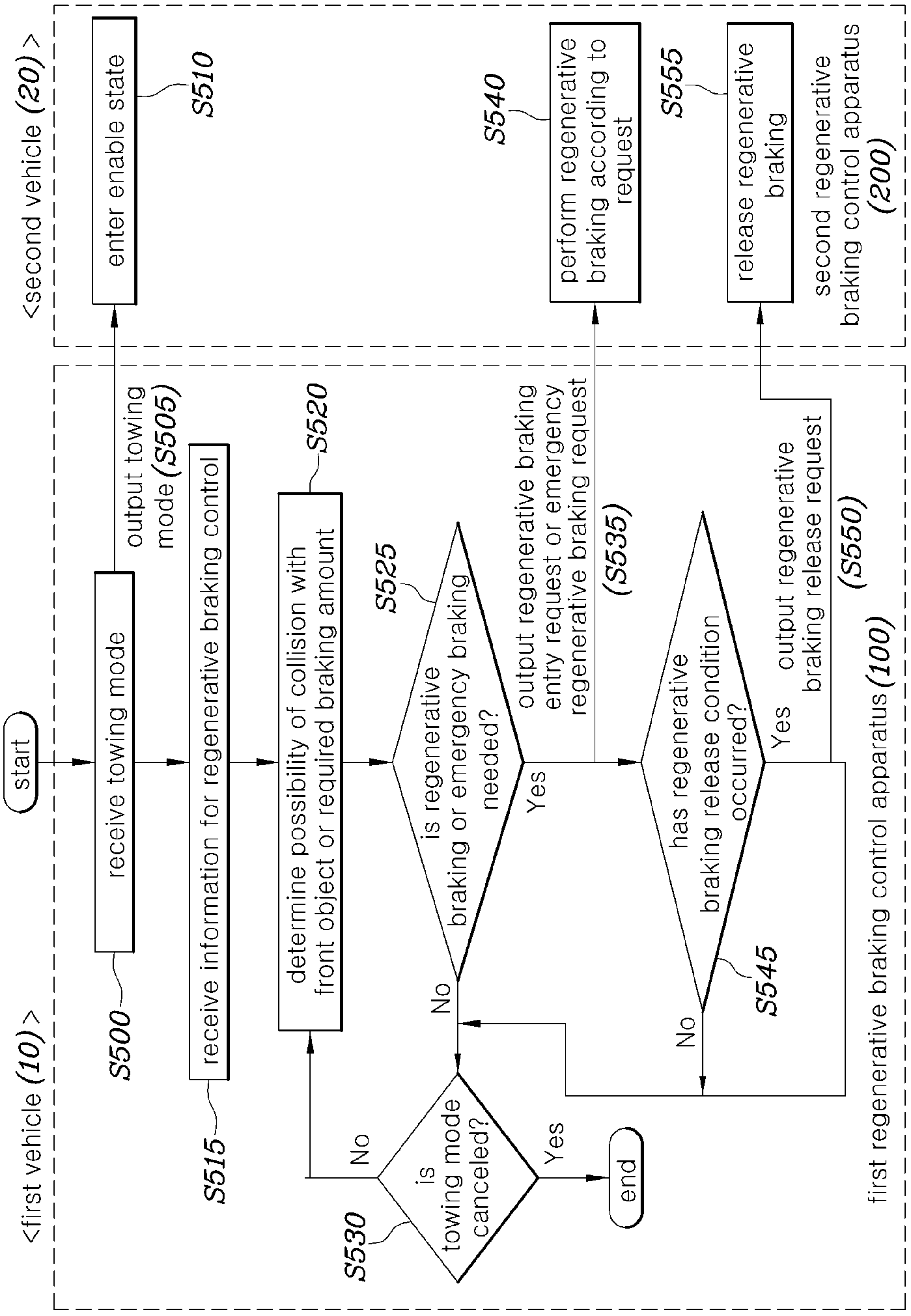
FIG. 5 is a view for describing a method of controlling regenerative braking between vehicles according to an exemplary embodiment of the present disclosure.

FIG. 5 is a view for describing a method of controlling regenerative braking between vehicles according to an exemplary embodiment of the present disclosure.

The method for controlling the regenerative braking between vehicles according to the exemplary embodiment of the present disclosure will be described with reference to FIGS. 1, 2, and 5, and operations of the first regenerative braking control apparatus 100 and the second regenerative braking control apparatus 200 will be described mainly.

When receiving the towing mode provided from the user interface 13 (S500), the first regenerative braking control apparatus 100 may perform an operation for regenerative braking control for the towed vehicle 20.

When receiving the towing mode, the first regenerative braking control apparatus 100 may output the towing mode to the second regenerative braking control apparatus 200 (S505) so that the second regenerative braking control apparatus 200 enters the enable state (S510).

Accordingly, the first regenerative braking control apparatus 100 may receive the information for regenerative braking control (S515) and determine the possibility of collision between the host vehicle 10 and the front object or determine the required braking amount based on the received information (S520).

In operation S520, the first regenerative braking control apparatus 100 may be configured to determine the possibility of collision between the host vehicle 10 and the front object based on the detection information provided from the vehicle surrounding detection unit 11.

According to the exemplary embodiment of the present disclosure, the first regenerative braking control apparatus 100 may be configured to determine the TTC between the host vehicle 10 and the front object based on the detection information.

In operation S520, the first regenerative braking control apparatus 100 may be configured to determine the required braking amount based on the brake pedal displacement amount among the vehicle state information provided from the vehicle sensor unit 12.

According to the exemplary embodiment of the present disclosure, the first regenerative braking control apparatus 100 may be configured to determine the required braking amount by integrating the brake pedal displacement amount.

Accordingly, the first regenerative braking control apparatus 100 may be configured to determine whether regenerative braking or emergency braking is needed based on the possibility of collision or the required braking amount (S525).

In operation S525, the first regenerative braking control apparatus 100 may compare the TTC to the preset threshold and determine whether the regenerative braking or emergency braking is needed, or compare the required braking amount to the preset threshold and determine whether the regenerative braking or emergency braking is needed.

In operation S525, the first regenerative braking control apparatus 100 may be configured to determine that the regenerative braking is needed when the TTC is smaller than or equal to the first threshold and greater than the second threshold. In operation S525, the first regenerative braking control apparatus 100 may be configured to determine that the regenerative braking is needed when the required braking amount is greater than or equal to the third threshold and smaller than the fourth threshold.

According to the exemplary embodiment of the present disclosure, when determining that the regenerative braking is needed, the first regenerative braking control apparatus 100 may be configured to determine the regenerative braking level based on the TTC or required braking amount.

In operation S525, the first regenerative braking control apparatus 100 may be configured to determine that the regenerative braking is needed when the TTC is smaller than or equal to the second threshold or the required braking amount is greater than or equal to the fourth threshold.

In operation S525, when determining that the regenerative braking and the emergency braking are not needed (NO in S525), the first regenerative braking control apparatus 100 may be configured to determine whether the towing mode has been canceled (S530).

In operation S530, when determining that the towing mode is canceled (YES in S530), the first regenerative braking control apparatus 100 may end the regenerative braking control operation for the towed vehicle 20.

In operation S530, when determining that the towing mode is not canceled (NO in S530), the first regenerative braking control apparatus 100 may be configured to determine the possibility of collision with the front object or the required braking amount (S520).

Meanwhile, in operation S525, when determining that the regenerative braking or the emergency braking is needed, the first regenerative braking control apparatus 100 may output the regenerative braking entry request or the emergency regenerative braking request to the second regenerative braking control apparatus 200 according to a result of the determination (S535) so that the second regenerative braking control apparatus 200 performs the regenerative braking according to the request (S540).

According to the exemplary embodiment of the present disclosure, the first regenerative braking control apparatus 100 may provide the information related to the regenerative braking level when outputting the regenerative braking entry request so that the second regenerative braking control apparatus 200 performs the regenerative braking based on the information related to the regenerative braking level.

Accordingly, the first regenerative braking control apparatus 100 may be configured to determine whether the regenerative braking release condition has occurred (S545).

In operation S545, when determining that the host vehicle 10 is in a stopped state based on the vehicle state information provided from the vehicle sensor unit 12, the first regenerative braking control apparatus 100 may be configured to determine that the regenerative braking release condition has occurred.

In operation S545, when determining that the regenerative braking release condition has not occurred (NO in S545), the first regenerative braking control apparatus 100 may be configured to determine whether the towing mode has been canceled (S530).

In operation S545, when determining that the regenerative braking release condition has occurred (YES in S545), the first regenerative braking control apparatus 100 may output the regenerative braking release request to the second regenerative braking control apparatus 200 (S550) so that the second regenerative braking control apparatus 200 releases the regenerative braking (S555).

The first regenerative braking control apparatus 100 may output the regenerative braking release request to the second regenerative braking control apparatus 200 and then determine whether the towing mode has been canceled (S530).

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling regenerative braking, which is mounted in a towing vehicle and configured to control regenerative braking of a towed vehicle, the apparatus comprising:

a receiving unit configured to receive at least one of detection information related to a surrounding of a host vehicle and vehicle state information of the host vehicle; and a control unit configured to determine the host vehicle's possibility of collision with an object based on the detection information or determine a required braking amount based on the vehicle state information and output a request for the regenerative braking for the towed vehicle to the towed vehicle, wherein the control unit is configured to output a regenerative braking entry request or an emergency regenerative braking request according to the possibility of collision or the required braking amount, wherein the control unit is further configured to determine a time to collision (TTC) between the host vehicle and the object, compare the TTC with preset first and second thresholds, and output the regenerative braking entry request or the emergency regenerative braking request according to a result of the comparison, wherein the second threshold is smaller than the first threshold, and wherein the control unit is further configured to output the regenerative braking entry request in response that the TTC is smaller than or equal to the first threshold and greater than the second threshold and output the emergency regenerative braking request in response that the TTC is smaller than or equal to the second threshold.

2. The apparatus of claim 1, wherein the control unit is further configured to determine the required braking amount by integrating a brake pedal displacement amount among the vehicle state information, output the regenerative braking entry request in response that the required braking amount is greater than or equal to a third threshold and smaller than a fourth threshold, and output the emergency regenerative braking request in response that the required braking amount is greater than or equal to the fourth threshold, and wherein the third threshold is smaller than the fourth threshold.

3. The apparatus of claim 1, wherein the control unit is further configured to determine a regenerative braking level corresponding to the TTC in response that the TTC is smaller than or equal to the first threshold and greater than the second threshold and provide information related to the regenerative braking level to the towed vehicle.

4. A method for controlling regenerative braking of a towed vehicle by a control device mounted in a towing vehicle, the method comprising:

determining, by the control device, a possibility of collision with an object based on detection information related to a surrounding of a host vehicle or determining a required braking amount based on vehicle state information of the host vehicle; and outputting, by the control device, a request for the regenerative braking for the towed vehicle based on the possibility of collision or the required braking amount, wherein the outputting includes outputting a regenerative braking entry request or an emergency regenerative braking request according to the possibility of collision or the required braking amount, wherein the determining of the possibility of collision includes:

determining a time to collision (TTC) between the host vehicle and the object; and comparing the TTC to preset first and second thresholds, wherein the second threshold is smaller than the first threshold, and wherein the regenerative braking entry request is output in response that the TTC is smaller than or equal to the first threshold and greater than the second threshold, and the emergency regenerative braking request is output in response that the TTC is smaller than or equal to the second threshold.

5. The method of claim 4, wherein the determining of the required braking amount includes determining the required braking amount by integrating a brake pedal displacement amount among the vehicle state information, and wherein the regenerative braking entry request is output in response that the required braking amount is greater than or equal to a preset third threshold and smaller than a preset fourth threshold, and the emergency regenerative braking request is output in response that the required braking amount is greater than or equal to the fourth threshold, and the third threshold is smaller than the fourth threshold.

6. The method of claim 4, further including:

determining a regenerative braking level corresponding to the determined TTC in response that the determined TTC is smaller than or equal to the first threshold and greater than the second threshold, wherein information related to the regenerative braking level is provided to the towed vehicle together with the regenerative braking entry request.

7. An apparatus for controlling regenerative braking, which is mounted in a towed vehicle and configured to control the regenerative braking of a host vehicle according to a request from a towing vehicle, the apparatus comprising:

a first control unit configured to receive a regenerative braking request from the towing vehicle and output a request corresponding to the regenerative braking request; and a second control unit operatively connected to the first control unit and configured to perform regenerative braking according to the request output from the first control unit, wherein the regenerative braking request includes a regenerative braking entry request or an emergency regenerative braking request, wherein the regenerative braking request includes a regenerative braking entry request or an emergency regenerative braking request, wherein, in response to the regenerative braking entry request, the second control unit is configured to perform the regenerative braking based on information related to a regenerative braking level provided together with the regenerative braking entry request from the first control unit, and wherein, in response to the emergency regenerative braking request, the second control unit is configured to generate a preset maximum braking force.

8. The apparatus of claim 7, wherein the first control unit is further configured to provide information related to the regenerative braking level provided at a time of the regenerative braking entry request to the second control unit so that the second control unit performs the regenerative braking according to the information related to the regenerative braking level.

9. The apparatus of claim 7, wherein the first control unit is further configured to receive the regenerative braking request after receiving a towing mode from the towing vehicle to enter an enable state.

10. The apparatus of claim 7, wherein the first control unit is further configured to determine whether the regenerative braking release request is received when not receiving the regenerative braking request for a preset time.

11. A method for controlling regenerative braking, which is configured to control regenerative braking of a host vehicle according to a request from a towing vehicle by a control device mounted in a towed vehicle, the method comprising:

receiving a regenerative braking request from the towing vehicle; and performing the regenerative braking according to the regenerative braking request, wherein the regenerative braking request includes a regenerative braking entry request or an emergency regenerative braking request, wherein, in response to the regenerative braking entry request, the performing includes performing the regenerative braking based on information related to a regenerative braking level provided together with the regenerative braking entry request, and wherein, in response to the emergency regenerative braking request, the performing includes generating a preset maximum braking force.

12. The method of claim 11, wherein the performing includes performing the regenerative braking according to information related to the regenerative braking level provided at a time of the regenerative braking entry request in response that the regenerative braking entry request is received.

13. The method of claim 11, further including receiving a towing mode from the towing vehicle and entering an enable state before the receiving.

14. The method of claim 11, further including determining whether the regenerative braking release request is received in response that the regenerative braking request is not received for a preset time.

15. A system for controlling regenerative braking between vehicles, the system comprising:

a first regenerative braking control apparatus mounted in a towing vehicle; and a second regenerative braking control apparatus mounted in a towed vehicle and operatively connected to the first regenerative braking control apparatus, wherein the first regenerative braking control apparatus is configured to determine a possibility of collision with an object based on detection information related to a surrounding of a host vehicle or determine a required braking amount based on vehicle state information of the host vehicle and output a regenerative braking request to the towed vehicle based on the possibility of collision or the required braking amount, wherein the second regenerative braking control apparatus is configured to perform regenerative braking of the host vehicle according to the regenerative braking request output from the first regenerative braking control apparatus, wherein the regenerative braking request includes a regenerative braking entry request or an emergency regenerative braking request, wherein the first regenerative braking control apparatus is further configured to determine a time to collision (TTC) between the host vehicle and the object, compare the TTC with preset first and second thresholds, and output the regenerative braking entry request in response that the TTC is smaller than or equal to the first threshold and greater than the second threshold and output the emergency regenerative braking request in response that the TTC is smaller than or equal to the second threshold, and wherein the second threshold is smaller than the first threshold.

16. A method of controlling regenerative braking of a towed vehicle by a towing vehicle, the method comprising:

outputting, by a first regenerative braking control apparatus of a towing vehicle, a regenerative braking request to the towed vehicle based on a result of determining a possibility of collision with an object based on detection information related to a surrounding of a host vehicle or a result of determining a required braking amount based on vehicle state information of the host vehicle; and performing, by a second regenerative braking control apparatus of the towed vehicle which is operatively connected to the first regenerative braking control apparatus, regenerative braking of the host vehicle according to the regenerative braking request, wherein the outputting includes determining a time to collision (TTC) between the host vehicle and the object, comparing the TTC with preset first and second thresholds, outputting the regenerative braking entry request in response that the TTC is smaller than or equal to the first threshold and greater than the second threshold, and outputting an emergency regenerative braking request in response that the TTC is smaller than or equal to the second threshold, and wherein the second threshold is smaller than the first threshold.

* * * * *